United States Patent
Qiu et al.

(10) Patent No.: US 7,968,669 B2
(45) Date of Patent: *Jun. 28, 2011

(54) FLUOROPOLYMER COMPOSITIONS AND TREATED SUBSTRATES

(75) Inventors: Weiming Qiu, Wilmington, DE (US); Yun Yang, Newark, DE (US); Michael Henry Ober, Wilmington, DE (US); Anilkumar Raghavanpillai, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/152,736

(22) Filed: May 16, 2008

(65) Prior Publication Data

US 2009/0286949 A1    Nov. 19, 2009

(51) Int. Cl.
 *C08G 18/08* (2006.01)
 *C08G 18/16* (2006.01)

(52) U.S. Cl. .......... 528/49; 528/45; 528/69; 528/70; 528/76; 8/115.6; 8/115.64; 8/115.67; 8/115.51

(58) Field of Classification Search .......... 528/49, 528/70, 45, 69, 76; 8/115.6, 115.64, 115.67, 8/115.51
See application file for complete search history.

(56) References Cited

U.S. PATENT DOCUMENTS

| 4,788,287 A | 11/1988 | Matsuo et al. |
| 5,411,766 A * | 5/1995 | Kirchner .......... 427/393.4 |
| 5,580,645 A | 12/1996 | Kirchner |
| 7,344,758 B2 | 3/2008 | Franchina et al. |
| 2007/0006966 A1 | 1/2007 | Wang et al. |
| 2007/0091515 A1 | 4/2007 | Freitag et al. |
| 2007/0243389 A1 * | 10/2007 | Audenaert et al. .......... 428/423.1 |
| 2009/0287010 A1 * | 11/2009 | Qiu et al. .......... 558/15 |

FOREIGN PATENT DOCUMENTS

| GB | 1231952 | 5/1971 |
| JP | 1995026168 A | 1/1995 |
| WO | WO02/072657 A | 9/2002 |
| WO | WO 2008/000680 A1 | 1/2008 |
| WO | WO2009/076108 A | 6/2009 |

OTHER PUBLICATIONS

Rondestvedt et al, Nucleophilic Displacements on β-(Perfluoroalkyl)ethyl Iodides. Synthesis of Acrylates Containing Heteroatoms, Journal of Organic Chemistry (1977), 42(16), 2680-2683.

Trabelsi et al., Synthese des 2-F-alkylethylamines: optimization de l'obtention des azortures de 2-F-alkyethyle et de leur reduction en amines; Journal of Fluorine Chemistry (1994), 69, 115-117. Abstract.

\* cited by examiner

*Primary Examiner* — Milton I Cano
*Assistant Examiner* — Michael Leonard
(74) *Attorney, Agent, or Firm* — Nancy S. Mayer

(57) ABSTRACT

A polymer having at least one carbamate linkage prepared by: (i) reacting (a) at least one diisocyanate, polyisocyanate, or mixture thereof, and (b) at least one fluorinated compound selected from the formula (I):

$$R_f(CH_2)_x[(CF_2CF_2)_y(CH_2CH_2)_z]_m(R1)_r\text{-}xH \qquad (I)$$

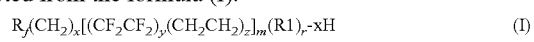

wherein $R_f$ is a perfluoroalkyl group having 1 to about 6 carbon atoms;
the total number of carbons in said formula (I) excluding $(R1)_r\text{-}XH$ ranges from about 8 to about 22;
and (ii) optionally reacting with (c) water, a linking agent, or a mixture thereof.

13 Claims, No Drawings

FLUOROPOLYMER COMPOSITIONS AND TREATED SUBSTRATES

FIELD OF THE INVENTION

The present invention relates to the use of fluoropolymers containing a carbamate linkage to provide surface effects to substrates.

BACKGROUND OF THE INVENTION

Various compositions are known to be useful as treating agents to provide surface effects to substrates. Surface effects include repellency to moisture, soil, and stains, and other effects, which are particularly useful for fibrous substrates and other substrates such as hard surfaces. Many such treating agents are fluorinated polymers or copolymers.

U.S. Pat. No. 5,411,766 discloses polyfluoro nitrogen containing organic compounds useful to provide oil repellency, water repellency, soil resistance and/or soil release properties to substrates treated therewith. Compounds exemplified contain mixtures of perfluoroalkyl groups having predominantly eight or more carbons.

Customer requirements for surface protection products are in a state of constant evolution, and there is a continuing need for new cost-effective, environmentally friendly chemical intermediates and products. Industry is constantly searching for compounds with minimum environmental impact and higher fluorine efficiency. In particular there is a need for short chain fluorochemicals wherein some of the expensive fluorocarbon moieties have been replaced with less expensive and more readily biodegradable moieties. However, the performance must be maintained or superior despite the reduction in fluorine. The present invention provides such fluorochemicals.

SUMMARY OF INVENTION

The present invention comprises a polymer having at least one carbamate linkage prepared by: (i) reacting (a) at least one diisocyanate, polyisocyanate, or mixture thereof, having isocyanate groups, and (b) at least one fluorinated compound selected from the formula (I):

$$R_f(CH_2)_x[(CF_2CF_2)_y(CH_2CH_2)_z]_m(R^1)_r\text{—}XH \qquad (I)$$

wherein $R_f$ is a linear or branched chain perfluoroalkyl group having 1 to about 6 carbon atoms;

subscript x is an integer from 1 to about 6;

subscripts y, z and m are each independently 1, 2 or 3, or a mixture thereof;

subscript r is 0 or 1;

the total number of carbons in said formula (I) excluding $(R^1)_r$—XH ranges from about 8 to about 22;

X is —O—, —NR—, —S—, —S(CH$_2$)$_t$O—, or —S(CH$_2$)$_t$NR—;

subscript t is from 1 to about 10;

R═H or C$_{1-4}$ alkyl;

$R^1$ is a divalent radical selected from the group consisting of —S(CH$_2$)$_n$—,

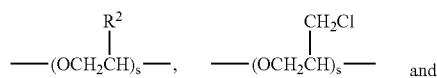

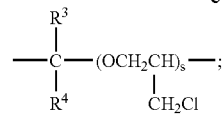

n is an integer of 2 to 4;

s is an integer of 1 to 50;

$R^2$, $R^3$, and $R^4$ are each independently hydrogen or an alkyl group containing 1 to 6 carbon atoms; and (ii) optionally reacting with (c) water, a linking agent, or a mixture thereof.

The present invention further comprises a method of providing water repellency, oil repellency, soil resistance, hydrophilic stain release, and wicking to substrates comprising contacting said substrate with a polymer having at least one carbamate linkage prepared by: (i) reacting (a) at least one diisocyanate, polyisocyanate, or mixture thereof, having isocyanate groups, and (b) at least one fluorinated compound selected from the formula (I) as disclosed above; and (ii) reacting with (c) water, a linking agent, or a mixture thereof.

The present invention further comprises a substrate to which has been applied a polymer having at least one carbamate linkage prepared by: (i) reacting (a) at least one diisocyanate, polyisocyanate, or mixture thereof, having isocyanate groups, and (b) at least one fluorinated compound selected from the formula (I), as disclosed above, and (ii) reacting with (c) water, a linking agent, or a mixture thereof.

DETAILED DESCRIPTION OF INVENTION

Hereinafter trademarks are designated by upper case.

The present invention comprises a polymer having at least one carbamate linkage prepared by: (i) reacting (a) at least one diisocyanate, polyisocyanate, or mixture thereof, having isocyanate groups, and (b) at least one fluorinated compound selected from the formula (I):

$$R_f(CH_2)_x[(CF_2CF_2)_y(CH_2CH_2)_z]_m(R^1)_r\text{—}XH \qquad (I)$$

wherein $R_f$ is a linear or branched chain perfluoroalkyl group having 1 to about 6 carbon atoms;

subscript x is an integer from 1 to about 6;

subscripts y, z and m are each independently 1, 2 or 3, or a mixture thereof;

subscript r is 0 or 1;

the total number of carbons in said formula (I) excluding $(R^1)_r$—XH ranges from about 8 to about 22;

X is —O—, —NR—, —S—, —S(CH$_2$)$_t$O—, or —S(CH$_2$)$_t$NR—;

subscript t is from 1 to about 10;

R is H or C$_{1-4}$ alkyl;

$R^1$ is a divalent radical selected from the group consisting of —S(CH$_2$)$_n$—,

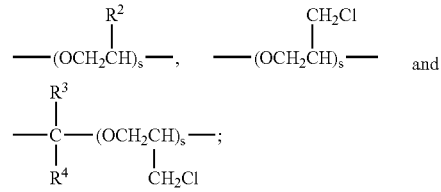

n is an integer of 2 to 4;

s is an integer of 1 to 50;

$R^2$, $R^3$, and $R^4$ are each independently hydrogen or an alkyl group containing 1 to 6 carbon atoms; and (ii) optionally reacting with (c) water, a linking agent, or a mixture thereof.

Preferred embodiments are polymers wherein for the reactant of formula (I), X is O, subscript x is 1 or 2, subscript y is 1 or 2, subscript z is 1 or 2, subscript m is 1 or 2, and subscript r is zero. Other preferred embodiments are when $R_f$ is a perfluoroalkyl having 4 to 6 carbon atoms. Fluorinated compounds useful in various embodiments of the invention are available by oligomerization of fluoroalkyl iodides by a mixture of tetrafluoroethylene and ethylene to produce fluorinated oligomeric ethylene-tetrafluoroethylene iodides. The iodides are used to prepare alkanols and other derivatives, which are useful as the reactant of formula (I) to prepare the polymers of the present invention. The intermediate iodides and derivatives are represented by formula (II)

$$C_nF_{2n+1}(CH_2)_x[(CF_2CF_2)_y(CH_2CH_2)_z]_m(R^1)_rG \quad (II)$$

wherein
G is I, OH, SH, $NH_2$, NHR, $S(CH_2)_tOH$, or $S(CH_2)_tNHR$,
subscript n is an integer from 1 to about 6,
subscript x is an integer from 1 to about 6,
subscripts y, z and m are each independently 1, 2 or 3, or a mixture thereof,
subscript t is from 1 to about 10,
R, $R^1$ and subscript r are as defined in formula (I), and
the total number of carbons in said formula (II) excluding $(R^1)_rG$ ranges from about 8 to about 22.

The initial product of the oligomerization reaction is a mixture of closely related oligomers of formula (II) wherein G is iodide. In addition to the major resulting oligomer, there will be other oligomers with slightly longer or shorter chain lengths, as is the nature of such reactions. There will also be a small percentage of oligomers where the ethylene and tetrafluoroethylene depart from the expected alternating sequence. The above formula (II) is intended to comprise not only the original mixture of oligomers from the oligomerization reaction and its alcohol and (meth)acrylate derivatives, but also a purified or partially purified form of these mixtures, as well the individual components of each mixture.

If desired, the major chemicals in the reaction mixture can be separated into individual components by differences in solubilities, melting points, vapor pressures and other features. For example, it has been found that the relative solubilities of such components in acetonitrile and tetrahydrofuran are useful in such purifications, as shown in the examples which follow. Other solvents and methods can also be used, as readily determined by those skilled in the art.

From a practical viewpoint, anything beyond the most simple purification is likely to be an unnecessary expense. When the intermediates of formula (II) are converted into the compounds of formula (I), all of the oligomers of formula (II) are expected to show similar properties to the major oligomer present, and be useful additions to the product of formula (I).

The fluoroalkyl iodides useful as telogen reactants for the preparation of the iodide compounds of formula (II) include $C_nF_{2n+1}CH_2CH_2I$, $C_nF_{2n+1}CH_2I$ and $C_nF_{2n+1}I$, wherein n is an integer from 1 to about 6. Preferably n is from about 2 to about 4; more preferably n is 2. The most preferable fluoroalkyl iodide reactant is perfluoroethylethyl iodide.

The iodides of formula (II), $$C_nF_{2n+1}(CH_2)_x[(CF_2CF_2)_y(CH_2CH_2)_z]_mI,$$

wherein m, n, x, y, and z are as defined above, are preferably prepared by oligomerization of $C_nF_{2n+1}C_2H_4I$, $C_nF_{2n+1}CH_2I$ or $C_nF_{2+1}I$ using a mixture of ethylene (ET) and tetrafluoroethylene (TFE). The reaction can be conducted at any temperature from room temperature to about 150° C. with a suitable radical initiator. Preferably the reaction is conducted at a temperature of from about 40° to about 100° C. with an initiator which has about a 10 hour half-life in that range. The feed ratio of the starting materials in the gas phase, that is the moles of $C_nF_{2n+1}C_2H_4I$, $C_nF_{2n+1}CH_2I$ or $C_nF_{2n+1}I$ vs the combined moles of ethylene and tetrafluoroethylene, can be used to control conversion of the reaction. This mole ratio is from about 1:3 to about 20:1, preferably from about 1:2 to about 5:1 The mole ratio of ethylene to tetrafluoroethylene is from about 1:10 to about 10:1, preferably from about 3:7 to about 7:3, and more preferably from about 4:6 to about 6:4.

The alcohols of formula (II)

$$C_nF_{2n+1}(CH_2)_x[(CF_2CF_2)_y(CH_2CH_2)_z]_mOH,$$

wherein m, n, x, y, and z are as described above, are prepared from the above oligomeric iodides ($C_nF_{2n+1}C_2H_4I$, $C_nF_{2n+1}CH_2I$ or $C_nF_{2n+1}$) using an oleum treatment and hydrolysis. It has been found, for example, that reacting with oleum (15% $SO_3$) at about 60° C. for about 1.5 hours, followed by hydrolysis using an iced dilute $K_2SO_3$ solution, and then followed by heating to about 100° C. for about 30 minutes gives satisfactory results. But other reaction conditions can also be used. After being cooled to ambient room temperature, a solid is precipitated, ioslated and purified. For example, the liquid is then decanted and the solid is dissolved in ether and washed with water saturated with NaCl, dried over anhydrous $Na_2SO_4$, and concentrated and dried under vacuum. Other conventional purification procedures can be employed.

Alternatively, the alcohols of formula (II) can be prepared by heating the above oligomeric iodides ($C_nF_{2n+1}C_2H_4I$, $C_nF_{2n+1}CH_2I$ or $C_nF_{2n+1}I$) with N-methylformamide to about 150° C. and holding for about 19 hours. The reaction mixture is washed with water to give a residue. A mixture of this residue with ethanol and concentrated hydrochloric acid is gently refluxed (at about 85° C. bath temperature) for about 2.5 hours. The reaction mixture is washed with water, diluted with dichloromethane, and dried over sodium sulfate. The dichloromethane solution is concentrated and distilled at reduced pressure to give the alcohol. Optionally N,N dimethylformamide can be used instead of N-methylformamide. Other conventional purification procedures can also be employed.

The amines of formula (II) of $C_nF_{2n+1}(CH_2)_x[(CF_2CF_2)_y(CH_2CH_2)_z]_mNH_2$, wherein m, n, x, y, and z are as described above, are prepared from the oligomeric azides ($C_nF_{2n+1}C_2H_4I$, $C_nF_{2n+1}CH_2N_3$ described below or from $C_nF_{2n+1}I$) by reduction using hydrazine hydrate and Ni-Raney as per a modified literature procedure (Trabelsi, H.; Szoenyi, F.; Michelangeli, N.; Cambon, A., J. Fluorine Chem., 1994, 69,115-117).

Transformation of oligomer azide to amine was performed in a mixed solvent system comprising 1:1 water and ethanol using hydrazine hydrate/Ni-Raney at 60° for 12 h. Alternatively, catalytic hydrogenation using Pt/C or various conditions involving other reducing agents described also could be used to effect this transformation.

The azides of $C_nF_{2n+1}(CH_2)_x[(CF_2CF_2)_y(CH_2CH_2)_z]_mN_3$, wherein m, n, x, y, and z are as described above in formula (II), are prepared from the oligomeric iodides ($C_nF_{2n+1}C_2H_4I$, $C_nF_{2n+1}CH_2I$ or $C_nF_{2n+1}I$) using sodium azide as per a modified procedure disclosed in the literature (Rondestvedt, C. S., Jr.; Thayer, G. L., Jr. J. Org. Chem. 1977, 42, 2680). Displacement of iodide to azide was performed in quantitative yields in a mixed solvent system comprising acetonitrile and water in a 3:1 ratio using sodium azide at 90° C. Alternatively a solvent system comprising dimethylformamide-water or acetone-water or isopropyl alcohol/water or other similar solvent system can be used for this reaction under similar conditions. Phase transfer reaction described by Cambon et. al. can be used for this conversion, which produced only moderate yield (20-30%) of the azide after 36 h at 100° C. (Trabelsi, H.; Szoenyi, F.; Michelangeli, N.; Cambon, A., J. Fluorine Chem., 1994, 69,115-117).

The thiols of formula (II) of $C_nF_{2n+1}(CH_2)_x[(CF_2CF_2)_y(CH_2CH_2)_z]_mSH$ wherein m, n, x, y, and z are as described above, are prepared from the oligomeric iodides ($C_nF_{2n+1}C_2H_4I$, $C_nF_{2n+1}CH_2I$ or $C_nF_{2n+1}I$) by the reaction with thiourea followed by hydrolysis of the thiouronium salt as per the literature procedure (Rondestvedt, C. S., Jr.; Thayer, G. L., Jr. J. Org. Chem. 1977, 42, 2680). The oligomeric iodides were refluxed with thiourea in ethanol for 36 h and hydrolyzed using sodium hydroxide to obtain the corresponding oligomeric thiols. Alternatively, displacement reaction using NaSH in ethanol could be used to effect this transformation.

The sulfur-containing alcohols of formula (I) of the present invention $C_nF_{2n+1}(CH_2)_x[(CF_2CF_2)_y(CH_2CH_2)_z]_mS(CH_2)_rOH$, wherein m, n, x, y, and z are as described above and r is 1 to 5, are prepared from the oligomeric iodides (Formula (I) where G is an iodide) by the displacement reaction with 2-mercaptoethanol as per the literature procedure (Rondestvedt, C. S., Jr.; Thayer, G. L., Jr. J. Org. Chem. 1977, 42, 2680). The oligomeric iodides were refluxed with 2-mercaptoethanol and sodium hydroxide in tert-butanol for 12 h to obtain the corresponding oligomeric hydroxyethyl sulfide.

The sulfur-containing amines of formula (I) of the present invention $C_nF_{2n+1}(CH_2)_x[(CF_2CF_2)_y(CH_2CH_2)_z]_mS(CH_2)_rNH_2$, wherein m, n, x, y, and z are as described above and r is 1 to 5, are prepared from the oligomeric iodides (Formula (I) where G is an iodide) by the displacement reaction with 2-aminoethanethiol as per the literature procedure. (Rondestvedt, C. S., Jr.; Thayer, G. L., Jr. J. Org. Chem. 1977, 42, 2680). The oligomeric iodides were refluxed with 2-mercaptoethylamine hydrochloride and sodium hydroxide in tert-butanol for 12 h to obtain the corresponding oligomeric aminoethyl sulfide.

Specific fluorinated alcohols of formula (II) useful in the preparation of the reactant of formula (I) are listed in Table 1A. The groups $C_3F_7$, $C_4F_9$, and $C_6F_{13}$, referred to in the list of specific alcohols in Tables 1A refer to linear perfluoroalkyl groups unless specifically indicated otherwise.

TABLE 1A

| Compound No. | Structure |
| --- | --- |
| 1. | $C_2F_5CH_2CH_2CF_2CF_2CH_2CH_2OH$, |
| 2. | $C_2F_5CH_2CH_2(CF_2CF_2)_2CH_2CH_2OH$, |
| 3. | $C_2F_5(CH_2CH_2)_2CF_2CF_2CH_2CH_2OH$, |
| 4. | $C_2F_5CH_2CH_2CF_2CF_2(CH_2CH_2)_2OH$, |
| 5. | $C_2F_5CH_2CH_2(CF_2CF_2CH_2CH_2)_2OH$, |
| 6. | $C_2F_5(CH_2CH_2)_2(CF_2CF_2CH_2CH_2)_2OH$, |
| 7. | $C_2F_5CH_2CH_2CF_2CF_2)_2(CH_2CH_2)_2OH$ |
| 8. | $C_2F_5CH_2CH_2(CF_2CF_2)_3CH_2CH_2OH$, |
| 9. | $C_2F_5CH_2CH_2CF_2CF_2(CH_2CH_2)_2CF_2CF_2CH_2CH_2OH$, |
| 10. | $C_2F_5(CH_2CH_2)_2(CF_2CF_2)_2CH_2CH_2OH$, |
| 11. | $C_4F_9CH_2CH_2CF_2CF_2CH_2CH_2OH$, |
| 12. | $C_4F_9CH_2CH_2(CF_2CF_2)_2CH_2CH_2OH$, |
| 13. | $C_4F_9(CH_2CH_2)_2CF_2CF_2CH_2CH_2OH$, |
| 14. | $C_4F_9CH_2CH_2CF_2CF_2(CH_2CH_2)_2OH$, |
| 15. | $C_4F_9CH_2CH_2(CF_2CF_2CH_2CH_2)_2OH$, |
| 16. | $C_4F_9(CH_2CH_2)_2(CF_2CF_2CH_2CH_2)_2OH$, |
| 17. | $C_4F_9CH_2CH_2CF_2CF_2)_2(CH_2CH_2)_2OH$ |
| 18. | $C_4F_9CH_2CH_2(CF_2CF_2)_3CH_2CH_2OH$, |
| 19. | $C_4F_9CH_2CH_2CF_2CF_2(CH_2CH_2)_2CF_2CF_2CH_2CH_2OH$, |
| 20. | $C_4F_9(CH_2CH_2)_2(CF_2CF_2)_2CH_2CH_2OH$, |
| 21. | $C_6F_{13}CH_2CH_2CF_2CF_2CH_2CH_2OH$, |
| 22. | $C_6F_{13}CH_2CH_2(CF_2CF_2)_2CH_2CH_2OH$, |
| 23. | $C_6F_{13}(CH_2CH_2)_2CF_2CF_2CH_2CH_2OH$, |
| 24. | $C_6F_{13}CH_2CH_2CF_2CF_2(CH_2CH_2)_2OH$, |

TABLE 1A-continued

| Compound No. | Structure |
| --- | --- |
| 25. | $C_6F_{13}CH_2CH_2(CF_2CF_2CH_2CH_2)_2OH$, |
| 26. | $C_6F_{13}(CH_2CH_2)_2(CF_2CF_2CH_2CH_2)_2OH$, |
| 27. | $C_6F_{13}(CH_2CH_2CF_2CF_2)_2(CH_2CH_2)_2OH$ |
| 28. | $C_6F_{13}CH_2CH_2(CF_2CF_2)_3CH_2CH_2OH$, |
| 29. | $C_6F_{13}CH_2CH_2CF_2CF_2(CH_2CH_2)_2CF_2CF_2CH_2CH_2OH$, |
| 30. | $C_6F_{13}(CH_2CH_2)_2(CF_2CF_2)_2CH_2CH_2OH$. |

Specific fluorinated telomer thiols of formula (II) wherein G is SH, which correspond to the above listed compounds 1 to 30 wherein G is OH, are also useful in the present invention to prepare the reactant of formula (I). Specific fluorinated telomer amines of formula (II) wherein G is $NH_2$, which correspond to the above listed compounds 1 to 30 wherein G is OH, are also useful in the present invention to prepare the reactant of formula (I).

The intermediates of formula (II) wherein G is OH, SH or $NH_2$ are used to prepare the reactant of formula (I) which is used to prepare the polymers of the present invention. To make the fluoropolymers of the present invention, a compound of formula (I) is reacted with a polyisocyanate. The polyisocyanate reactant adds to the branched nature of the polymer. By the term "polyisocyanate" is meant di- and higher isocyanates and the term includes oligomers. Any polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. It is recognized that minor amounts of diisocyanates may remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers. Preferred is DESMODUR N-3300 (a hexamethylene diisocyanate-based isocyanurate available from Bayer Corporation, Pittsburgh, Pa.). Other triisocyanates useful for the purposes of this invention are those obtained by reacting three moles of toluene diisocyanate with 1,1,1-tris-(hydroxymethyl)ethane or 1,1,1-tris(hydroxymethyl)propane. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3600, DESMODUR Z-4470, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Particularly preferred as the polyisocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas (IIa), (IIb), (IIc) and (IId):

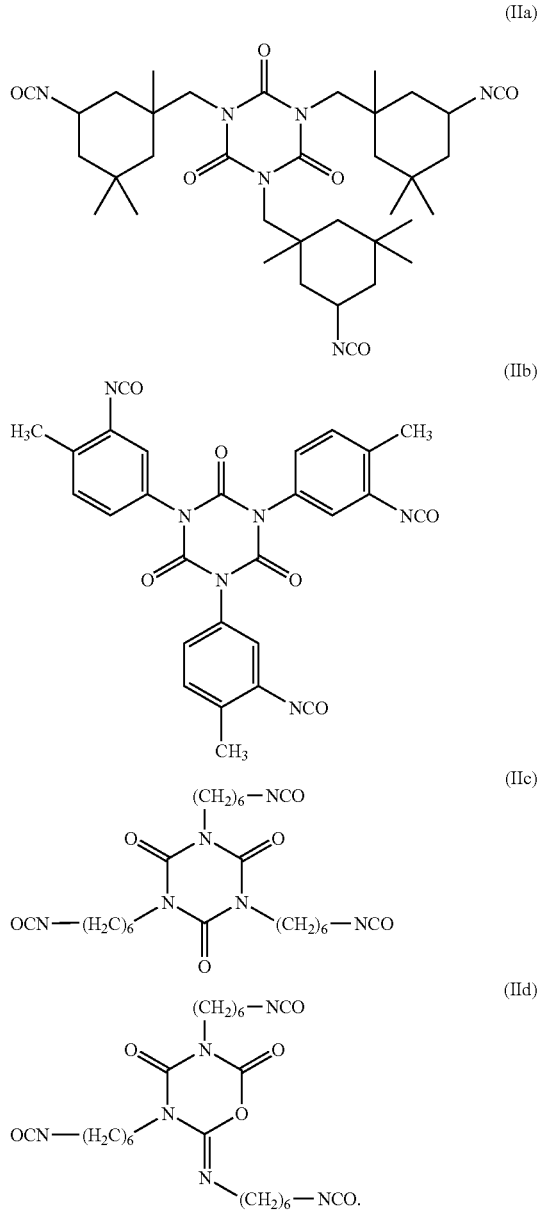

The diisocyanate trimers (IIa-d) are available, for instance as DESMODUR Z4470, DESMODUR IL, DESMODUR N-3300, and DESMODUR XP2410, respectively, from Bayer Corporation.

To make the fluoropolymers of the present invention, a compound of formula (I) is reacted with a polyisocyanate to produce a fluoropolymer. The fluoropolymer is typically prepared by charging a reaction vessel with the polyisocyanate, the above fluoroalcohol, fluorothiol or fluoroamine, or mixture thereof, and optionally a non-fluorinated organic compound. The order of reagent addition is not critical. The specific weight of the polyisocyanate and other reactants charged is based on their equivalent weights and on the working capacity of the reaction vessel, and is adjusted so that alcohol, thiol or amine, will be consumed in the first step. The charge is agitated and temperature adjusted to about 40° C.-70° C. Typically a catalyst such as a titanium chelate in an organic solvent is then added and the temperature is raised to about 80° C.-100° C. After holding for several hours, additional solvent and water, a linking agent, or a combination thereof, is added, and the mixture allowed to react for several more hours or until all of the isocyanate has been reacted. More water can then be added along with surfactants, if desired, and stirred until thoroughly mixed. Following homogenization, the organic solvent can be removed by evaporation at reduced pressure, and the remaining aqueous solution of the fluoropolymer used as is or subjected to further processing.

In a preferred embodiment, step (i) reacting, further comprises (d) a non-fluorinated organic compound selected from the group consisting of formula $$R^{10}-(R^{11})_k-YH,$$

wherein
$R^{10}$ is a linear, branched or cyclic $C_1$-$C_{18}$ alkyl, a $C_1$-$C_{18}$ omega-alkenyl radical or a $C_1$-$C_{18}$ omega-alkenoyl radical;
$R^{11}$ is

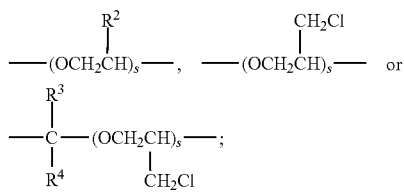

wherein
$R^2$, $R^3$ and $R^4$ are, independently, H or $C_1$ to $C_6$ alkyl;
s is 1 to 50;
k is 0 or 1; and
Y is —O—, —S—, or —N($R^5$)— wherein $R^5$ is H or alkyl containing 1 to 6 carbon atoms.

Preferably the non-fluorinated compound of formula $R^{10}-(R^{11})_k-YH$ reacts with about 0.1 mol % to about 60 mol % of said isocyanate groups.

In another preferred embodiment, the compound of formula $R^{10}-(R^{11})_k-YH$ comprises a hydrophilic water-solvatable material comprising at least one hydroxyl-terminated polyether of formula (III):

Formula (III)

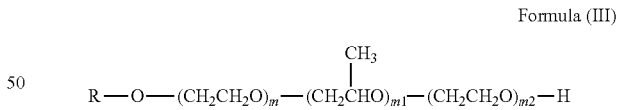

wherein
R is a monovalent hydrocarbon radical containing no more than six aliphatic or alicyclic carbon atoms;
Subscripts m and m2 are independently an average number of repeating oxyethylene groups, and m1 is an average number of repeating oxypropylene groups, respectively; provided that m is always a positive integer, while m1 and m2 are a positive integer or zero. When m1 and m2 are zero, formula (III) designates an oxyethylene homopolymer. When m1 is a positive integer and m2 is zero, formula (III) designates a block or random copolymer of oxyethylene and oxypropylene. When m1 and m2 are positive integers, formula (III) designates a triblock copolymer designated PEG-PPG-PEG (polyethylene glycol-polypropylene glycol-polyethylene glycol) More preferably, the hydrophilic, water-solvatable components (3) are the commercially available methoxypolyethylene glycols (MPEG's), or mixtures thereof, having an average molecular weight equal to or greater than about 200, and most preferably between 350 and 2000. Also commercially available, and suitable for the preparation of the polyfluoro organic compounds of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000.

The non-fluorinated compound of formula $R^{10}$—$(R^{11})_k$—YH is reacted in step (i) with the polyisocyanate and fluorinated compound of formula (I) as described above, prior to the reaction with water, linkage agent, or a mixture thereof. This initial reaction is conducted so that less than 100% of the polyisocyanate groups are reacted. Following the initial reaction, water, linkage agent, or a mixture thereof, is added. The reaction of water or linkage agent with the residual NCO groups completely reacts all of the isocyanate groups and eliminates a further purification step that would be needed if other reactants were used at a ratio sufficient to react with 100% of the isocyanate groups. Further, this addition greatly increases the molecular weight of the polymers and assures proper mixing if more than one reactant is used in the first step of the polymer preparation, i.e., if a water solvatable component is added, it is likely that at least one unit will be present in each polymer.

Linking agents useful in forming polymers of the invention organic compounds have two or more Zerewitinoff hydrogen atoms (Zerevitinov, Th., Quantitative Determination of the Active Hydrogen in Organic Compounds, Berichte der Deutschen Chemischen Gesellschaft, 1908, 41, 2233-43). Examples include compounds that have at least two functional groups that are capable of reacting with an isocyanate group. Such functional groups include hydroxyl, amino and thiol groups. Examples of polyfunctional alcohols useful as linking agents include: polyoxyalkylenes having 2, 3 or 4 carbon atoms in the oxyalkylene group and having two or more hydroxyl groups, for instance, polyether diols such as polyethylene glycol, polyethylene glycol-polypropylene glycol copolymers, and polytetramethylene glycol; polyester diols, for instance, the polyester diols derived from polymerization of adipic acid, or other aliphatic diacids, and organic aliphatic diols having 2 to 30 carbon atoms; non-polymeric polyols including alkylene glycols and polyhydroxyalkanes including 1,2-ethanediol, 1,2-propanol diol, 3-chloro-1,2-propanediol, 1,3-propanediol, 1,3-butanediol, 1,4-butanediol, 2,2-dimethyl-1,3-propanediol, 1,2-, 1,5-, and 1,6-hexanediol, 2-ethyl-1,6-hexanediol, 1,8-octanediol, 1,10-decanediol, glycerine, trimethylolethane, trimethylolpropane, 2-ethyl-2-(hydroxymethyl)-1,3-propanediol, 1,2,6-hexanetriol, and pentaerythritol.

Preferred polyfunctional amines useful as linking agents include: amine terminated polyethers such as, for example, JEFFAMINE D400, JEFFAMINE ED, and JEFFAMINE EDR-148, all from Huntsman Chemical Company, Salt Lake City, Utah; aliphatic and cycloaliphatic amines including amino ethyl piperazine, 2-methyl piperazine, 4,4'-diamino-3,3'-dimethyl dicyclohexylmethane, 1,4-diaminocyclohexane, 1,5-diamino-3-methylpentane, isophorone diamine, ethylene diamine, diethylene triamine, triethylene tetraamine, triethylene pentamine, ethanol amine, lysine in any of its stereoisomeric forms and salts thereof, hexane diamine, and hydrazine piperazine; and arylaliphatic amines such as xylylenediamine and a,a,a',a'-tetramethylxylylenediamine.

Mono- and di-alkanolamines that can be used as linking agents include: monoethanolamine, monopropanolamine, diethanolamine, dipropanolamine, and the like.

The fluoropolymers of the present invention are prepared in a suitable dry organic solvent free of groups that react with isocyanate groups. Ketones are the preferred solvents, and methylisobutylketone (MIBK) is particularly preferred for convenience and availability. The reaction of the alcohols with the polyisocyanate is optionally carried out in the presence of a catalyst, such as dibutyltindilaurate or tetraisopropyl titanate, typically in an amount of from about 0.01 to about 1.0 weight %. A preferred catalyst is tetraisopropyl titanate.

The resulting composition is then diluted with water, or further dispersed or dissolved in a solvent selected from the groups comprising simple alcohols and ketones that are suitable as the solvent for final application to substrates, hereinafter the "application solvent".

Alternatively, an aqueous dispersion, made by conventional methods with surfactants, is prepared by removing solvents by evaporation and the use of emulsification or homogenization procedures known to those skilled in the art. Surfactants may include anionic, cationic, nonionic, or blends. Such solvent-free emulsions are preferred to minimize flammability and volatile organic compounds (VOC) concerns.

The final product for application to a substrate is a dispersion (if water based) or a solution (if solvents other than water are used) of the fluoropolymer.

Preferred polymers of the invention are wherein $R_f$ has 4 to 6 carbon atoms, x is 2, y and z are each 1, m is 1 or 2, and r is 0. Other preferred embodiments are polymers wherein said fluorinated compound reacts with about 5 mol % to about 90 mol %, and more preferably about 10 mol % to about 70 mol %, of said isocyanate groups. Other preferred embodiments are polymers wherein the linking group is a diamine or polyamine.

It will be apparent to one skilled in the art that many changes to any or all of the above procedures may also be used to optimize the reaction conditions for obtaining maximum yield, productivity or product quality.

The present invention further comprises a method of providing water repellency, oil repellency, soil resistance, hydrophilic stain release, and wicking to a substrate comprising contacting the polymers of the invention as solutions or dispersions with a substrate. Suitable substrates include fibrous or hard surface substrates as defined below.

The polymers of the invention, as solutions or dispersions, are applied to the substrate surface by any suitable method. Such methods are well known to those skilled in the art, and include, for example, application by exhaustion, foam, flex-nip, nip, pad, kiss-roll, beck, skein, winch, liquid injection, overflow flood, roll, brush, roller, spray, dipping, immersion, and the like. It can also be applied by use of the conventional beck dyeing procedure, continuous dyeing procedure or thread-line application.

The dispersion or solution is diluted for application until the percent total fluorine in the dispersion or solution, based on weight of the dispersion or solution, is from about 0.01% to about 20%, preferably from about 0.01% to about 15%, and most preferably from about 0.01% to about 10% by weight. Application rates for the solution or dispersion of the present invention are in the range of from about 0.5 to about 1000 g/m$^2$ depending on the substrate porosity.

The composition of this invention is applied to the substrate as such, or in combination with other finishes or surface treating agents. The composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil resistance, soil release, water repellency, oil repellency, odor control, antimicrobial, stain resist, sun protection, and similar effects. One or more such treating agents or finishes can be combined with the blended composition and applied to the fibrous substrate.

In particular for fibrous substrates, when textiles such as synthetic or cotton fabrics are treated, a wetting agent can be used, such as ALKANOL 6112 available from E. I. du Pont de Nemours and Company, Wilmington, Del. When cotton or cotton-blended fabrics are treated, a wrinkle-resistant resin can be used such as PERMAFRESH EPC available from Omnova Solutions, Chester, S.C.

Other additives commonly used with such treating agents or finishes can also be present such as surfactants, pH adjusters, cross linkers, wetting agents, wax extenders, and other additives known by those skilled in the art. Suitable surfactants include anionic, cationic, nonionic, and combinations thereof. For instance, a suitable anionic surfactant is sodium alkyl sulfate, available as SUPRALATE WAQE from Witco Corporation, Greenwich Conn. Examples of such finishes or agents include processing aids, foaming agents, lubricants, anti-stains, and the like. The composition is applied at a manufacturing facility, retailer location, or prior to installation and use, or at a consumer location.

Optionally a blocked isocyanate to further promote durability can be added to the fluoropolymer of the present invention (i.e., as a blended isocyanate). An example of a suitable blocked isocyanate is HYDROPHOBAL HYDORPHOBOL XAN available from Ciba Specialty Chemicals, High Point N.J. Other commercially available blocked isocyanates are also suitable for use herein. The desirability of adding a blocked isocyanate depends on the particular application for the treating agent. For most of the presently envisioned applications, it does not need to be present to achieve satisfactory cross-linking between chains or bonding to the substrate. When added as a blended isocyanate, amounts up to about 20% by weight can be added.

Optionally, non-fluorinated extender compositions can also be included in the application composition to obtain some combination of benefits. Examples of such an optional additional extender polymer composition is that disclosed in co-pending U.S. Provisional Application 60/607,612 filed Sep. 7, 2004 (CH-2996), and in U.S. Ser. No. 11/175,680 filed Jul. 6, 2005 (CH-3048).

The polymers of the present invention are applied to suitable substrates by a variety of customary procedures. For application to washable apparel fabrics, the polymers are applied, for example, from an aqueous dispersion or an organic solvent solution by brushing, dipping, spraying, padding, roll-coating, foaming or the like. They can be applied to dyed and undyed textile substrates. For textiles, the composition of the present invention is preferably applied in an amount of from about 5 g/L to about 100 g/L, more preferably from about 10 g/L to about 50 g/L.

In the case of a carpet substrate, the "wet pick up" is the weight of the dispersion or solution of the polymer applied to the carpet, based on the dry weight of the carpet face fiber. A low wet pickup bath system can be interchanged with low wet pickup spray or foam systems, and a high wet pickup bath system can be interchanged with other high wet pickup systems, e.g., flex-nip system, foam, pad, or flood. The method employed determines the appropriate wet pickup and whether the application is made from one side of the carpet (spray and foam applications) or both sides (flex-nip and pad). The following Table 2 provides typical process specifications for application to carpet substrates.

TABLE 2

Typical Wet Pickup Range for Various Applications

| Application | Wet Pickup Range - % |
|---|---|
| Flex-nip | 150-350 |
| Flood | 100-500 |
| Foam | 5-300 |
| Pad | 100-500 |
| Spray | 5-300 |

The dispersion or solution of the composition of the present invention is diluted for application. For carpets the percent total fluorine in the dispersion or solution by weight is preferably from about 0.01% to about 20%, more preferably from about 0.01% to about 5%, and more preferably from about 0.01% to about 2%.

Many variations of the conditions for spray, foam, flex-nip, flood, and pad applications are known to those skilled in the art and the preceding conditions are provided as examples and are not intended to be exclusive. The dispersion or solution of the present invention is typically applied to a carpet at a wet pickup of about 5% to about 500%, and preferably cured at from about 220° F. (104° C.) to about 260 (127° C.). Alternatively, the treated carpet can be air dried. Optionally the carpet can be pre-wetted before application of the dispersion or solution of the present invention. To pre-wet the carpet, the carpet is immersed in water and the excess water suctioned off. The "wet pickup" is the weight of the dispersion or solution of the present invention applied to the carpet based on the dry weight of the carpet face fiber.

For fibrous substrates, the amount of polymer applied is an amount sufficient to provide at least 100 micrograms per gram to about 5000 micrograms per gram by weight of fluorine based on the weight of dry substrate. For carpets after drying, the treated carpet preferably contains about 100 micrograms per gram to about 1000 micrograms per gram fluorine based on the weight of the dried carpet.

For leather substrates, the composition of the present invention is applied by spraying onto dry or semi-wet hides, or immersion of leather into the fluoropolymer. The fluoropolymer is applied during processing, or applied after completion of the normal tanning, retanning, or dying processes. It is preferred to combine the application of the polymer with the manufacturing process during the final stages of leather manufacture. The amount of polymer applied to the leather is an amount sufficient to provide a dry leather containing from about 0.2 to about 20 g fluorine/m$^2$, preferably from about 0.2 to about 2.3 g fluorine/m$^2$.

The present invention also comprises substrates treated with the composition of the present invention. Suitable substrates include fibrous substrates. The fibrous substrates include woven and nonwoven fibers, yarns, fabrics, fabric blends, paper, leather, rugs and carpets. These are made from natural or synthetic fibers including cotton, cellulose, wool, silk, polyamide, polyester, polyolefin, polyacrylonitrile, polypropylene, rayon, nylon, aramid, and acetate. By "fabric blends" is meant fabric made of two or more types of fibers. Typically, these blends are a combination of at least one natural fiber and at least one synthetic fiber, but also can include a blend of two or more natural fibers or of two or more synthetic fibers. Carpet substrates can be dyed, pigmented, printed, or undyed. Fibers and yarns in the carpet substrates may be dyed, pigmented, printed, or undyed. Carpet substrates can be scoured or unscoured. Substrates to which it is particularly advantageous to apply the compounds of the present invention so as to impart soil resistant properties include those prepared from polyamide fibers (such as nylon), cotton and blends of polyester and cotton, particularly such substrates being used in tablecloths, washable uniforms and the like.

The compositions of the present invention are useful to provide one or more of excellent water repellency, oil repellency, soil resistance, hydrophilic stain release, and wicking to treated substrates. These properties are obtained using lower fluorine concentrations compared with conventional perfluorocarbon surface treatment agents, providing improved "fluorine efficiency" in the protection of treated surfaces. The compositions of the present invention also allow for the use of compounds having minimal environmental impact. The following examples are intended only to illustrate the invention, and should not be interpreted so as to limit the invention in any way other than by the attached claims.

Materials and Test Methods

The following test methods and materials were use in the examples herein.

Test Method 1—Water Repellency

The water repellency of a treated substrate was measured according to AATCC standard Test Method No. 193-2004 and the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the substrate and the extent of surface wetting is determined visually. The higher the water repellency rating, the better the resistance of a finished substrate to staining by water-based substances. The composition of water repellency test liquids is shown in Table 3.

TABLE 3

Water Repellency Test Liquids

| Water Repellency Rating Number | Composition, Vol. % | |
|---|---|---|
| | Isopropyl Alcohol | Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Testing procedure: Three drops of Test Liquid 1 are placed on the treated substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 2—Oil Repellency

The treated samples were tested for oil repellency by a modification of AATCC standard Test Method No. 118, conducted as follows. A substrate treated with an aqueous dispersion of polymer as previously described, is conditioned for a minimum of 2 hours at 23° C. and 20% relative humidity and 65° C. and 10% relative humidity. A series of organic liquids, identified below in Table 4, are then applied dropwise to the samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating is the highest numbered test liquid for which two of the three drops remained spherical to hemispherical, with no wicking for 30 seconds. In general, treated samples with a rating of 5 or more are considered good to excellent; samples having a rating of one or greater can be used in certain applications.

TABLE 4

Oil Repellency Test Liquids

| Oil Repellency Rating Number | Test Solution |
|---|---|
| 1 | NUJOL Purified Mineral Oil |
| 2 | 65/35 NUJOL/n-hexadecane (v/v) at 21° C. |
| 3. | n-hexadecane |
| 4 | n-tetradecane |
| 5 | n-dodecane |
| 6 | n-decane |
| 7 | n-octane |
| 8 | n-heptane |

Note: NUJOL is a trademark of Plough, Inc., for a mineral oil having a Saybolt viscosity of 360/390 at 38° C. and a specific gravity of 0.880/0.900 at 15° C.

Test Method 3—Accelerated Soiling Drum Test

A drum mill (on rollers) was used to tumble synthetic soil onto carpet samples. Synthetic soil was prepared as described in AATCC Test Method 123-2000, Section 8. Soil-coated beads were prepared as follows. Synthetic soil, 3 g, and 1 liter of clean nylon resin beads [SURLYN ionomer resin beads, ⅛-3/16 inch (0.32-0.48 cm) diameter, were placed into a clean, empty canister. SURLYN is an ethylene/methacrylic acid copolymer, available from E. I. du Pont de Nemours and Co., Wilmington, Del. The canister lid was closed and sealed with duct tape and the canister rotated on rollers for 5 min. The soil-coated beads were removed from the canister.

Carpet samples to insert into the drum were prepared as follows. Total carpet sample size was 8×25 inch (20.3×63.5 cm) for these tests. The carpet pile of all samples was laid in the same direction. The shorter side of each carpet sample was cut in the machine direction (with the tuft rows). Strong adhesive tape was placed on the backside of the carpet pieces to hold them together. The carpet samples were placed in the clean, empty drum mill with the tufts facing toward the center of the drum. The carpet was held in place in the drum mill with rigid wires. Soil-coated resin beads, 250 cc, and 250 cc of ball bearings (5/16 inch, 0.79 cm diameter) were placed into the drum mill. The drum mill lid was closed and sealed with duct tape. The drum was run on the rollers for 2½ min at 105 revolutions per minute (rpm). The rollers were stopped and the direction of the drum mill reversed. The drum was run on the rollers for an additional 2½ minutes at 105 rpm. The carpet samples were removed and vacuumed uniformly to removes excess dirt. The soil-coated beads were discarded.

The Delta E color difference for the soiled carpet was measured for the test and control items versus the original unsoiled carpet. Color measurement of each carpet was conducted on the carpet following the accelerated soiling test. For each control and test sample the color of the carpet was measured, the sample was soiled, and the color of the soiled carpet was measured. The Delta E is the difference between the color of the soiled and unsoiled samples, expressed as a positive number. The color difference was measured on each item, using a Minolta Chroma Meter CR-410. Color readings were taken at five different areas on the carpet sample, and the average Delta E was recorded. The control carpet for each test item was of the same color and construction as the test item. A lower Delta E indicates less soiling and superior soil resistance.

Test Method 4—Wicking Test

For the wicking test, 5 drops of DI water were placed on the cotton samples on different areas of the material. The time (in seconds) it took to completely absorb into the cotton was recorded. Wicking is an indication of hydrophilicity, and test results are referred to herein either wicking or hydrophilic stain release. For garments where repellency is important, a higher wicking number is desired.

Test Method 5—Stain Release Evaluation

The stain release test was taken from the AATCC Test Method 130-1995. Five drops of either mineral oil or corn oil were placed in the center of the treated cotton sample on a piece of blotter paper. A piece of glassine paper (weighing paper) was placed over the spot and a five-pound weight was placed on top of the paper. After 60 seconds, the weight and glassine paper were removed. Four red dots were marked around the oil spot. The cotton material were placed in the Kenmore washing machine with the following settings of Large load, Warm (100° F.)/Cold, One rinse, Ultra Clean (setting 12), and Normal (fast/slow). Then 100 g of AATCC WOB detergent and 4 lbs. of material including ballasts were added to the washing machine. After washing, the samples were placed in the Kenmore dryer on the high setting for 45 minutes. The samples were rated based on the Stain Release Replica.

TABLE 5

Stain Release Grades

| | |
|---|---|
| Grade 5 | Stain equivalent to Standard Stain 5 |
| Grade 4 | Stain equivalent to Standard Stain 4 |
| Grade 3 | Stain equivalent to Standard Stain 3 |
| Grade 2 | Stain equivalent to Standard Stain 2 |
| Grade 1 | Stain equivalent to Standard Stain 1 |

Grade 5 represents the best stain removal and Grade 1 the poorest stain removal.

Test Method 6—Wash Durability

The fabric samples were washed following the washing procedure of International Standard for textile testing. Fabric samples are loaded into a horizontal drum, front-loading type (Type A, WASCATOR Fom71MP-Lab) of automatic washing machine with a ballast load to give a total dry load of 4 lb. A commercial detergent is added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast are washed a designated number of times (5HW for 5 washes, 20HW for 20 washes, etc.). After washing, the samples were placed in a Kenmore dryer on the high setting for 45 minutes. The samples are then again tested for stain release and wicking using Test Methods 4 and 5 to indicate durability of these properties.

Materials

A) Carpet

1) Residential

A residential carpet was used for testing in the Examples which consisted of a residential loop carpet construction (30 oz/sq yd) having a nylon 6,6 face fiber that had been dyed to a light yellow color and had received a stain resist treatment of 1.2% of stain resist SR-500 available from E. I. du Pont de Nemours and Company, Wilmington, Del. (100% solids basis).

2) Commercial

The commercial carpet used for testing of Examples 1 and 2 consisted of a commercial loop carpet construction (28 oz/sq yd) having a nylon 6,6 face fiber that had been dyed to a yellow color. Carpet was obtained from Invista, Inc., Wilmington, Del.

The residential and commercial carpets for testing received a pre-spray application of water at 25% wet pickup. The carpets were then treated with spray application of the fluoropolymers of the Examples and Comparative Examples at 25% wet pick-up. The dispersions were diluted with water to the degree necessary to obtain a desired fluorine content (as indicated in the Tables in the Examples) delivered to the carpet using 25% wet pick-up. The treated carpet was then dried to a carpet fiber face temperature of 250° F. (121° C.).

B) Textile

100% Avondale cotton (white woven cotton available from Avondale Mills, Warrenville, S.C.) was used for testing in the Examples. The dispersed fluoropolymers of the Examples each were added to a separate 200 g aqueous bath in the amount indicated in the Tables in the Examples. The cotton was then run through the bath for a pad application of the fluoropolymer, and then through the padder. The cotton was then cured at 330° F. (166° C.) for 3 minutes, and permitted to cool to ambient temperature.

EXAMPLES

Example 1

A 400 mL shaker tube was charged with perfluoroethylethyl iodide (PFEEI) (45 g) and VAZO 64 (1 g), a polymerization initiator available from E. I. du Pont de Nemours and Company, Wilmington, Del. After cool evacuation, ethylene (6 g) and tetrafluoroethylene (25 g) were added. The resulting mixture was heated to 80° C. for 20 hours. The unreacted perfluoroethylethyl iodide was recovered by vacuum distillation at room temperature. The remaining solid was extracted with $CH_3CN$ (3×100 mL). The $CH_3CN$ extracts were concentrated and distilled at reduced pressure to give pure iodide 1,1,2,2,5,5,6,6-octahydroperfluoro-1-iodooctane. The solid remaining after $CH_3CN$ extraction was extracted with warm tetrahydrofuran. The tetrahydrofuran extract was concentrated and dried to give pure 1,1,2,2,5,5,6,6,9,9,10,10- dodecahydroperfluoro-1-iodododecane. The solid remaining after tetrahydrofuran extraction was mainly iodides of formula $C_2F_5(CH_2CH_2CF_2CF_2)_nCH_2CH_2I$ (wherein n=3 and higher oligomers), which have very low solubility in common solvents. The products 1,1,2,2,5,5,6,6-octahydroperfluoro-1-iodooctane and 1,1,2,2,5,5,6,6,9,9,10,10-dodecahydroperfluoro-1-iodododecane were characterized by H NMR and F NMR as shown below:

A) 1,1,2,2,5,5,6,6-octahydroperfluoro-1-iodooctane: mp 75-77° C.:

H NMR (CDCl3) 2.33 (m, 4H), 2.68 (m, 2H), 3.24 (m, 2H) ppm.

F NMR (CDCl3) −85.9 (s, 3F), −115.8 (m, 4F), −119.2 (m, 2F) ppm.

B) 1,1,2,2,5,5,6,6,9,9,10,10-dodecahydroperfluoro-1-iodododecane: mp 125-8° C.:

H NMR (acetone-d6) 2.46 (m, 8H), 2.77 (m, 2H), 3.37 (m, 2H) ppm.

F NMR (acetone-d6) −86.7 (s, 3F), −117.1 (m, 6F), −117.3 (m, 2F), −119.5 (m, 2F) ppm.

A mixture of 1,1,2,2,5,5,6,6-octahydroperfluoro-1-iodooctane (136.91 g, 248.88 mmol) prepared as above, and N-methylformamide (NMF) (273 mL) was heated to 150° C. for 19 hours. The reaction mixture was washed with water (4×500 mL) to give a residue. A mixture of this residue, ethanol (200 mL), and concentrated hydrochloric acid (1 mL) was gently refluxed (85° C. bath temperature) for 2.5 hours. The reaction mixture was washed with water (200 mL×2), diluted with dichloromethane (200 mL), dried over sodium sulfate overnight. The dichloromethane solution was concentrated and distilled at reduced pressure to give 1,1,2,2,5,5,6,6-octahydroperfluoro-1-octanol, 50.8 g.

To a dry 250 ml flask was charged with DESMODUR N3300 isocyanate (5 g, available from Bayer Company, Pittsburgh, Pa.). The flask was set up with reflux condenser, thermal couple under nitrogen gas. This was followed by addition of 1,1,2,2,5,5,6,6-octahydroperfluoro-1-octanol (5.7 g) and MIBK (methyl isobutyl ketone) (20 g). The mixture was heated to 50° C. Dibutyltin dilaurate in MIBK (0.4% solution, 2.4 g) was added. The reaction temperature was adjusted to 85° C. and was held for 4 hours. Water (6 g) was added slowly over time and the mixture held at 75° C. for 8 hrs. Testing with an isocynate test strip (Aliphatic Isocyanate Surface SWYPE, Colormetric Technologies, Inc, Des Plaines, Ill.) showed no more isocyanate was present. Witco C-6094 (1.57 g available from Akzo Nobel Surface Chemistry, LLC, Houston, Tex.) was mixed with hot deionized water (30 g) and added to the reaction mixture. The reaction mixture was stirred at 75° C. for about 2 hours, then sonified for 2 minutes. The MIBK was removed by vacuum distillation and the dispersion was filtered through a milk filter. The percent solids was adjusted by adding deionized water to 24%. The resulting fluoropolymer was applied to commercial carpet as described previously under Materials. The carpet was tested for water repellency using Test Method 1, oil repellency using Test Method 2, and accelerated soil resistance using Test Method 3, with results shown below in Table 6.

Comparative Example A

Comparative Example A was a commercially available carpet product available from E. I. du Pont de Nemours and Company, Wilmington, Del. The fluoropolymer was prepared from $R_fCH_2CH_2OH$ wherein $R_f$ is a mixture of perfluoroalkyl homologs containing from 2 to 18 carbon atoms, and DESMODUR N100 isocyanate. The fluoropolymer was applied to carpet and tested as in Examples 1 and 2. The results are shown in Tables 6 and 7 respectively.

TABLE 6

Commercial Carpet

| Sample | F ppm* | Repellency Water | Oil | After Drum soil ΔE |
|---|---|---|---|---|
| Comparative example A | 800 | 6 | 5 | 35.87 |
| Example 1 | 500 | 5 | 3 | 34.16 |
| Example 1 | 800 | 5 | 4 | 33.31 |

*ppm = micrograms per gram

The data in Table 6 shows that Example 1 had better soil resistance compared with Comparative Example A at the same fluorine level, and also at a lower fluorine level. Oil and water repellency were comparable to that of Comparative Example A at the same fluorine level.

Example 2

A mixture of 1,1,2,2,5,5,6,6,9,9,10,10-dodecahydroperfluoro-1-iodododecane (65.62 g) prepared as in Example 1, and N-methylformamide (135 mL) was heated to 150° C. for 4 hours. The reaction mixture was washed with water (1 L) to give a solid product. This solid product was added ethanol (150 mL) and concentrated hydrochloric acid (1 mL) to the solids and heated at reflux (85° C.) for 19 hours. The reaction mixture was poured into water (500 mL) and the resulting solid was washed with water (3×300 mL), dried on vacuum to give 1,1,2,2,5,5,6,6,9,9,10,10-dodecahydroperfluoro-1-dodecanol (50.8 g), yield 98%, mp 112-5° C.

To a dry 250 ml flask was charged with DESMODUR N3300 isocyanate (2.0 g available from Bayer Company, Pittsburgh, Pa.). The flask was set up with reflux condenser, thermal couple under nitrogen gas. This was followed by addition of cyclohexanol (0.26 g from Aldrich Company, St. Louis, Mo.), 1,1,2,2,5,5,6,6,9,9,10,10-dodecahydroperfluoro-1-dodecanol (3.15 g) prepared as described above, and MIBK (methyl isobutylketone) (30 g). The mixture was heated to 50° C. Dibutyltin dilaurate in MIBK (0.4% solution, 2 g) was added. The reaction temperature was adjusted to 85° C. and was held for 4 hours. Testing with an isocynate test strip (Aliphatic Isocyanate Surface SWYPE, Colormetric Technologies, Inc, Des Plaines, Ill.) showed no more isocyanate was present. Witco C-6094 (1.17 g) (available from Akzo Nobel Surface Chemistry, LLC, Houston, Tex.) was mixed with hot deionized water (60 g) and added to the reaction mixture. 55 g of hot toluene were added. The reaction mixture was stirred at 70° C. for about an hour, then sonified four minutes. No final reaction with water was conducted. Solvents were removed by vacuum distillation and the product was filtered through a milk filter. A dispersion was obtained with 10.4% in solids. The resulting fluoropolymer was applied to commercial carpet as described previously under Materials. The carpet was tested for water repellency using Test Method 1, oil repellency using Test Method 2, and accelerated soil resistance using Test Method 3. The resulting data is in Table 7.

TABLE 7

Commercial Carpet

| Sample | F ppm | Repellency Water | Oil | After Drum soil ΔE |
|---|---|---|---|---|
| Comparative Example A | 800 | 6 | 5 | 35.27 |
| Example 2 | 330 | 5 | 0 | 35.64 |

* ppm = micrograms per gram

The data in Table 7 demonstrated that Example 2 had comparable soil resistance when compared to the Comparative Example A while containing a much lower fluorine level. Water repellency remained similar while oil repellency did not. It is not unusual to have low oil repellency when fluorine level is very low (about 300 ppm) on carpet.

Comparative Example B

A 4-neck 1 mL round bottom flask was set-up with an additional funnel, thermocouple, mechanical stirrer, a nitrogen inlet, condenser, and gas outlet. The flask was charged with DESMODUR N3300 isocyanate (156.9 g) available from Bayer Company, Pittsburgh, Pa., MIBK (methyl isobutylketone) (92 g), and $FeCl_3$ in MIBK (0.4% solution, 2.8 g). The reaction mixture was heated to 60° C. Poly(ethylene glycol) methyl ether (MPEG750, 16.45 g, available from Aldrich Company, St. Louis, Mo.) was added dropwise through a dropping funnel. The reaction mixture was heated at 60° C. for 30 minutes, followed by addition of 1H, 1H, 2H, 2H perfluorooctanol available from E. I. du Pont de Nemours and Company, Wilmington, Del. (120 g) through a dropping funnel. The reaction temperature was raised to 95° C. and was held for 4 hrs. The temperature was dropped to 85° C., and then 115 g of MIBK was added to the solution followed by 46 g of water, and heated at 85° C. overnight. When testing for isocyanates using a test strip (Aliphatic Isocyanate Surface SWYPE, Colormetric Technologies, Inc, Des Plaines, Ill.) was negative, the solution was cooled to 75° C. 1000 g of hot water (75-80° C.) was then added to the solution without stirring. This was stirred for 30 minutes at 78° C. MIBK was removed by vacuum distillation and the dispersion was filtered through a milk filter. Standardization with deionized water gave a dispersion with 25% solid content. The resulting fluoropolymer was applied to 100% white Avondale cotton from Avondale Mills, Warrenville, S.C. as described previously under Materials using a loading level of 0.3% fluorine by weight of the bath. The fabric was tested for wicking and hydrophilic stain release using Test Methods 4, 5, and 6. The results are in Tables 8 and 9.

Comparative Example C

Comparative Example C was a commercially available textile treating agent available from E. I. du Pont de Nemours and Company, Wilmington, Del. The fluoropolymer was prepared from $R_fCH_2CH_2OH$ wherein $R_f$ is a mixture of perfluoroalkyl homologs containing from 2 to 18 carbon atoms, poly(ethylene glycol) methyl ether (MPEG750, available from Aldrich Company, St. Louis, Mo.), and DESMODUR N100 isocyanate available from Bayer Company, Pittsburgh, Pa. The fluoropolymer was applied to white 100% Avondale cotton from Avondale Mills, Warrenville, S.C. as described previously under Materials using a loading level of 0.3% fluorine by weight of the bath. The fabric was tested for wicking and hydrophilic stain release using Test Methods 4, 5, and 6. The results are in Tables 8 and 9.

Example 3

To a dry 250 ml flask was charged with DESMODUR N3300 isocyanate (3.5 g, available from Bayer Company, Pittsburgh, Pa.). The flask was then set up with reflux condenser, thermal couple under nitrogen. This was followed by addition of 1,1,2,2,5,5,6,6-octahydroperfluoro-1-octanol (3.18 g) prepared as in Example 1, poly(ethylene glycol) methyl ether (MPEG750, 3.5 g, available from Aldrich Company, St. Louis, Mo.), and MIBK (methyl isobutyl ketone) (26 g). Dibutyltin dilaurate in MIBK (0.4% solution, 0.8 g) was added. The reaction temperature was adjusted to 85° C. and was held for about 3 hrs. Hot deionized water (63 g) was added and the mixture held at 85° C. for 1 hr. The mixture was sonified for 2 minutes. MIBK was removed by vacuum distillation and the mixture was filtered through a milk filter. A dispersion was obtained (solids 17.9%). The resulting fluoropolymer was applied to fabric (Avondale 100% white cotton, available from Avondale Mills, Warrenville, S.C.) as described previously under Materials using a loading level of 0.3% fluorine by weight of the bath. The fabric was tested for wicking and hydrophilic stain release using Test Methods 4, 5, and 6. The results are in Table 8.

TABLE 8

| | Fabric | | |
|---|---|---|---|
| | Avondale cotton | Avondale cotton Example | Avondale cotton |
| | Comparative C | Comparative B | Example 3 |
| Bath Composition, 200 g total | | | |
| Fluoropolymer, grams | 6 (8.04% F) | 9.61 (5.02% F) | 17.05 (2.83% F) |
| Acetic acid, g | 0.5 | 0.5 | 0.5 |
| Permafresh, g | 14 | 14 | 14 |
| Water, g | 179.5 | 175.89 | 168.45 |
| Application to Fabric | | | |
| Dry weight, g* | 95.5 | 94.2 | 96.9 |
| Wet weight, g* | 124 | 119.6 | 124 |

TABLE 8-continued

| | Fabric | | |
|---|---|---|---|
| | Avondale cotton | Avondale cotton | Avondale cotton |
| | | Example | |
| | Comparative C | Comparative B | Example 3 |
| Leader weight, g* | 21 | 21.85 | 23 |
| Wet pickup % | 66.44 | 65.31 | 67.79 |
| Stain Release Ratings | | | |
| Corn Oil rating | | | |
| 0 HW | 4 | 4 | 3 |
| 5 HW | 3.5 | 3.5 | 3 |
| Mineral oil rating | | | |
| 0 HW | 3 | 4 | 3 |
| 5 HW | 2.5 | 3.5 | 2 |
| Wicking time, sec | | | |
| 0 HW | >180 | >180 | >180 |
| 5 HW | 9-20 | 48->180 | 20->180 |

*Leader weight is the weight of the fabric that was not wetted and thus not padded. Dry weight means the weight of fabric when it was dry. Wet weight means the weight of the fabric after it was padded and after the leader part was cut off.

The data in Table 8 shows that the stain release of Example 3 was comparable to that of Comparative Examples B and C while having a lower fluorine level present. Wicking time was also similar. The drop in wicking time after five washes is an indication of the level of durability of the wicking.

Example 4

A mixture of 1,1,2,2,5,5,6,6,9,9,10,10-dodecahydroperfluoro-1-iodododecane (65.62 g) prepared as in Example 1, and N-methylformamide (135 mL) was heated to 150° C. for 4 hours. The reaction mixture was washed with water (1 L) to give a solid product. This solid product was added ethanol (150 mL) and concentrated hydrochloric acid (1 mL) to the solids and heated at reflux (85° C.) for 19 hours. The reaction mixture was poured into water (500 mL) and the resulting solid was washed with water (3×300 mL), dried on vacuum to give 1,1,2,2,5,5,6,6,9,9,10,10-dodecahydroperfluoro-1-dodecanol (50.8 g), yield 98%, mp 112-5° C.

A mixture of 1,1,2,2,5,5,6,6,9,9,10,10-dodecahydroperfluoro-1-iodododecane (65.62 g) prepared as above, and N-methylformamide (135 mL) was heated to 150° C. for 4 hours. The reaction mixture was washed with water (1 L) to give a solid product. This solid product was added ethanol (150 mL) and concentrated hydrochloric acid (1 mL) to the solids and heated at reflux (85° C.) for 19 hours. The reaction mixture was poured into water (500 mL) and the resulting solid was washed with water (3×300 mL), dried on vacuum to give 1,1,2,2,5,5,6,6,9,9,10,10-dodecahydroperfluoro-1-dodecanol (50.8 g), yield 98%, mp 112-5° C.

To a dry 250 ml flask was charged with DESMODUR N3300 isocyanate (3.0 g, available from Bayer Company, Pittsburgh, Pa.). The flask was then set up with reflux condenser, thermal couple under nitrogen gas. This was followed by addition of 1,1,2,2,5,5,6,6,9,9,10,10-dodecahydroperfluoro-1-dodecanol (2.54 g) prepared as described above, poly(ethylene glycol) methyl ether (MPEG750, 2.96 g, available from Aldrich Company, St. Louis, Mo.), and methyl isobutyl ketone (MIBK) (30 g). Dibutyltin dilaurate in MIBK (0.4% solution, 1.6 g) was added. The reaction temperature was adjusted to 85° C. and was held for about 6 hrs. Hot deionized water (47 g) was added and the mixture held at 75° C. for overnight. MIBK was removed by vacuum distillation and the mixture was filtered through a milk filter. A dispersion was obtained (solids 16.5%). The resulting fluoropolymer was applied to fabric (100% Avondale cotton from Avondale Mills, Warrenville, S.C.) as described previously under Materials using a loading level of 0.3% by weight of the bath. The fabric was tested for wicking and hydrophilic stain release using Test Methods 4, 5, and 6. The results are in Table 9.

TABLE 9

| | Fabric | | |
|---|---|---|---|
| | Avondale cotton | Avondale cotton | Avondale cotton |
| | | Example | |
| | Comparative C | Comparative B | Example 4 |
| Bath Composition, 200 g total | | | |
| Fluoropolymer | 6 (8.04% F) | 9.61 (5.02% F) | 16.03 (3.01% F) |
| Acetic acid, g | 0.5 | 0.5 | 0.5 |
| Permafresh, g | 14 | 14 | 14 |
| Water, g | 179.5 | 175.89 | 169.47 |

TABLE 9-continued

| | Fabric | | |
|---|---|---|---|
| | Avondale cotton | Avondale cotton Example | Avondale cotton |
| | Comparative C | Comparative B | Example 4 |
| Application to Fabric | | | |
| Dry weight, g* | 69.5 | 66 | 62.3 |
| Wet weight, g* | 88.5 | 84 | 79.7 |
| Leader weight, g* | 15.8 | 14.83 | 14.49 |
| Wet pickup % | 64.80 | 64.16 | 66.71 |
| Stain Release Ratings | | | |
| Corn Oil rating | | | |
| 0 HW | 4.5 | 4.5 | 4 |
| 5 HW | 4 | 4 | 3 |
| Mineral oil rating | | | |
| 0 HW | 4.5 | 4.5 | 3.8 |
| 5 HW | 4 | 4 | 3 |
| Wicking time, sec | | | |
| 0 HW | >180 | >180 | >180 |
| 5 HW | 9-20 | 48->180 | 20->180 (600) |

*Leader weight is the weight of the fabric that was not wetted and thus not padded. Dry weight means the weight of fabric when it was dry. Wet weight means the weight of the fabric after it was padded and after the leader part was cut off.

The data in Table 9 shows that the stain release of Example 4 was comparable to that of Comparative Examples B and C while having a lower fluorine level present. Wicking time for Example 4 was higher than the Comparative Examples B and C and had comparable durability.

Example 5

To a dry 500 ml flask was charged with DESMODUR N3300 isocyanate (60.0 g, available from Bayer Company, Pittsburgh, Pa.). The flask was set up with reflux condenser, thermal couple under nitrogen gas. This was followed by addition of methyl isobutyl ketone (35.24 g) and dibutyltin dilaurate in methyl isobutyl ketone (0.4% solution, 6.0 g). The mixture was heated to 60° C. 1,1,2,2,5,5,6,6-octahydro-perfluoro-1-octanol (84.81 g) in methyl isobutyl ketone (109.57 g) was added. The reaction temperature was adjusted to 100° C. and was held for 72 hours. Water (1.78 g) was added slowly over time and the mixture held at 100° C. for 12 hrs. Testing with an isocynate test strip (Aliphatic Isocyanate Surface SWYPE, Colormetric Technologies, Inc, Des Plaines, Ill.) showed no more isocyanate was present. To 20.0 g of the above mixture was added DOWFAX 2A1 (1.6 g available from Dow Chemical Company, Midland, Mich.) mixed with hot deionized water (28.0 g) and added to the reaction mixture. The reaction mixture was stirred at 75° C. for about 2 hours, then sonified for 4 minutes and filtered through a milk filter. The methyl isobutyl ketone was removed by vacuum distillation and the dispersion was filtered through a milk filter. The percent solids was adjusted by adding deionized water to 15.57%. The resulting fluoropolymer was applied to commercial carpet as described previously under Materials. The carpet was tested for water repellency using Test Method 1, oil repellency using Test Method 2, and accelerated soil resistance using Test Method 3, with results shown below in Table 10.

TABLE 10

| | Commercial Carpet | | | |
|---|---|---|---|---|
| | | Repellency | | |
| Sample | F ppm* | Water | Oil | After Drum soil ΔE |
| Comparative Example A | 800 | 6 | 5 | 23.79 |
| Example 3 | 800 | 5 | 2 | 23.84 |

*ppm = micrograms per gram

The data in Table 10 shows that Example 5 had comparable soil resistance to that of Comparative Example A at the same fluorine level. Oil and water repellency were comparable to that of Comparative Example A at the same fluorine level.

Example 6

To a dry 500 ml flask was charged with DESMODUR N100 isocyanate (60.0 g, available from Bayer Company, Pittsburgh, Pa.). The flask was set up with reflux condenser, thermal couple under nitrogen gas. This was followed by addition of methyl isobutyl ketone (35.24 g) and dibutyltin dilaurate in methyl isobutyl ketone (0.4% solution, 6.0 g). The mixture was heated to 60° C. 1,1,2,2,5,5,6,6-octahydro-perfluoro-1-octanol (85.59 g) in methyl isobutyl ketone (110.35 g) was added. The reaction temperature was adjusted to 100° C. and was held for 72 hours. Water (1.78 g) was added slowly over time and the mixture held at 100° C. for 12 hrs. Testing with an isocynate test strip (Aliphatic Isocyanate Surface SWYPE, Colormetric Technologies, Inc, Des Plaines, Ill.) showed no more isocyanate was present. To 20.0 g of the above mixture was added WITCO C-6094 (1.6 g available from Akzo Nobel Surface Chemistry, LLC, Houston, Tex.) mixed with hot deionized water (28.0 g) and added to the reaction mixture. The reaction mixture was stirred at 75° C. for about 2 hours, then sonified for 4 minutes and filtered through a milk filter. The methyl isobutyl ketone was removed by vacuum distillation and the dispersion was filtered through a milk filter. The percent solids was adjusted by adding deionized water to 15.52%. The resulting fluoropolymer was applied to commercial carpet as described previously under Materials. The carpet was tested for water repellency using Test Method 1, oil repellency using Test Method 2, and accelerated soil resistance using Test Method 3, with results shown below in Table 11.

TABLE 11

Commercial Carpet

| Sample | F ppm* | Repellency | | After Drum soil ΔE |
|---|---|---|---|---|
| | | Water | Oil | |
| Comparative Example A | 800 | 6 | 5 | 35.78 |
| Example 4 | 800 | 5 | 2 | 34.57 |

*ppm = micrograms per gram

The data in Table 11 shows that Example 6 had better soil resistance compared with Comparative Example A at the same fluorine level. Oil and water repellency were comparable to that of Comparative Example A at the same fluorine level.

What is claimed is:

1. A polymer having at least one carbamate linkage prepared by:
   (i) reacting (a) at least one diisocyanate, polyisocyanate, or mixture thereof, having isocyanate groups, and (b) at least one fluorinated compound selected from the formula (I):

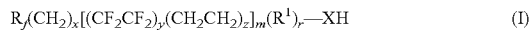

$$R_f(CH_2)_x[(CF_2CF_2)_y(CH_2CH_2)_z]_m(R^1)_r\text{—}XH \quad (I)$$

wherein
   $R_f$ is a linear or branched chain perfluoroalkyl group having 1 to about 6 carbon atoms;
   subscript x is an integer from 1 to about 6;
   subscripts y, z and m are each independently 1, 2 or 3, or a mixture thereof;
   subscript r is 0 or 1;
   the total number of carbons in said formula (I) excluding $(R^1)_rXH$ ranges from about 8 to about 22;
   X is —O—, —NR—, —S—, —S(CH$_2$)$_t$O—, or —S(CH$_2$)$_t$NR—;
   subscript t is from 1 to about 10;
   R is H or $C_{1-4}$ alkyl;
   $R^1$ is a divalent radical selected from the group consisting of —S(CH$_2$)$_n$—,

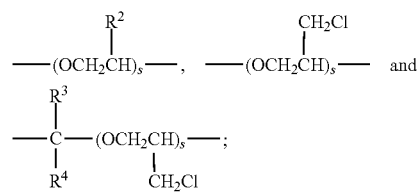

n is an integer of 2 to 4;
   s is an integer of 1 to 50;
   $R^2$, $R^3$, and $R^4$ are each independently hydrogen or an alkyl group containing 1 to 6 carbon atoms; and
   (ii) optionally reacting with (c) water, a linking agent, or a mixture thereof.

2. The polymer of claim 1 wherein for the reactant of formula (I), X is O, and subscripts x, y, z, and m are each independently 1 or 2, and subscript r is 0.

3. The polymer of claim 1 wherein $R_f$ has 4 to 6 carbon atoms.

4. The polymer of claim 1 wherein $R_f$ has 4 to 6 carbon atoms, x is 2, y and z are each 1, m is 1 or 2, and r is 0.

5. The polymer of claim 1 wherein said fluorinated compound reacts with about 5 mol % to about 90 mol % of said isocyanate groups.

6. The composition of claim 1 wherein the diisocyanate or polyisocyanate is selected from the group consisting of hexamethylene diisocyanate homopolymer, 3-isocyanatomethyl-3,4,4-trimethylcyclohexyl isocyanate, bis-(4-isocyanatocyclohexyl)methane and diisocyanate trimers of formulas (IIa), (IIb), (IIc) and (IId):

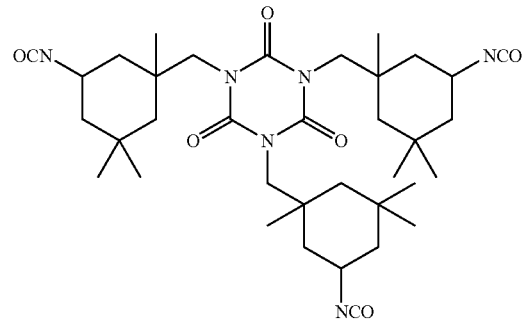

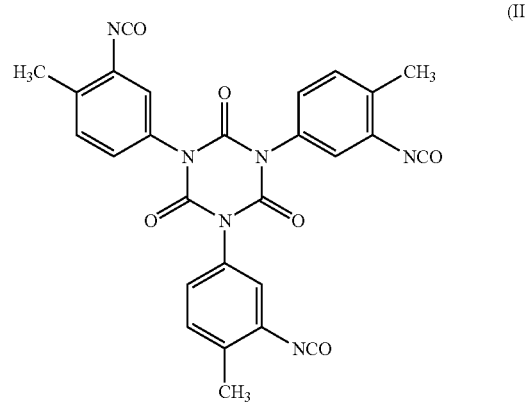

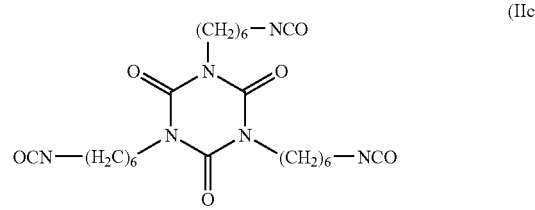

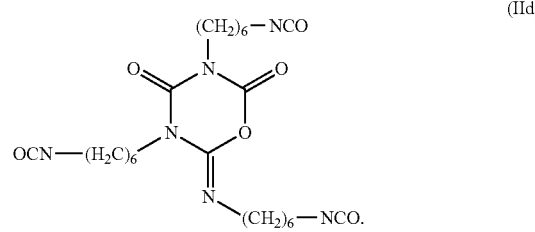

7. The polymer of claim 1 wherein step (i) reacting, further comprises (d) a non-fluorinated organic compound selected from the group consisting of formula

$$R^{10}\text{—}(R^{11})_k\text{—}YH$$

wherein
R[10] is a $C_1$-$C_{18}$ alkyl, a $C_1$-$C_{18}$ omega-alkenyl radical or a $C_1$-$C_{18}$ omega-alkenyl;
R[11] is selected from the group consisting of

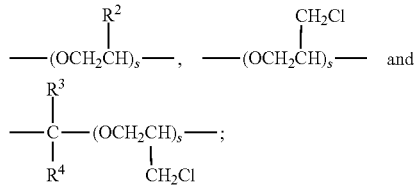

wherein
$R^2$, $R^3$ and $R^4$ are each independently, H or $C_1$ to $C_6$ alkyl, and
s is an integer of 1 to 50;
k is 0 or 1,
Y is —O—, —S—, or —NR[5]— in which $R^5$ is H or alkyl containing 1 to 6 carbon atoms.

8. The polymer of claim 7, wherein the compound of formula
R[10]—(R[11])$_k$—YH comprises a hydrophilic water-solvatable material comprising at least one hydroxy-terminated polyether of formula (III):

Formula (III)

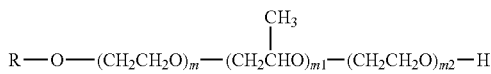

wherein
R is a monovalent hydrocarbon radical containing from about one to about six aliphatic or alicyclic carbon atoms;
m is a positive integer, and m1 and m2 are each independently a positive integer or zero; said polyether having a weight average molecular weight up to about 2000.

9. The polymer of claim 7 wherein said non-fluorinated compound reacts with about 0.1 mol % to about 60 mol % of said isocyanate groups.

10. The polymer of claim 1 wherein the linking agent is a diamine or polyamine.

11. The polymer of claim 1 in the form of an aqueous dispersion or solution.

12. The polymer of claim 1 further comprising one or more agents providing at least one surface effect selected from the group consisting of no iron, easy to iron, shrinkage control, wrinkle free, permanent press, moisture control, softness, strength, anti-slip, anti-static, anti-snag, anti-pill, stain repellency, stain release, soil resistance, soil release, water repellency, oil repellency, stain resist, odor control, antimicrobial, and sun protection.

13. The polymer of claim 1 further comprising a surfactant, pH adjuster, cross linker, wetting agent, blocked isocyanate, wax extender, or hydrocarbon extender.

* * * * *